United States Patent
O'Brien et al.

(10) Patent No.: US 11,667,821 B2
(45) Date of Patent: *Jun. 6, 2023

(54) ONE-COMPONENT ADHESIVE COMPOSITIONS

(71) Applicant: STEPAN COMPANY, Northfield, IL (US)

(72) Inventors: Michael E. O'Brien, Hainesville, IL (US); Warren A. Kaplan, Libertyville, IL (US); Jennifer S. Westfall, Bethel Park, PA (US)

(73) Assignee: STEPAN COMPANY, Northfield, IL (US)

(*) Notice: Subject to any disclaimer, the term of this patent is extended or adjusted under 35 U.S.C. 154(b) by 19 days.

This patent is subject to a terminal disclaimer.

(21) Appl. No.: 17/348,199

(22) Filed: Jun. 15, 2021

(65) Prior Publication Data

US 2021/0309895 A1    Oct. 7, 2021

Related U.S. Application Data

(63) Continuation of application No. PCT/US2019/066592, filed on Dec. 16, 2019.

(60) Provisional application No. 62/893,407, filed on Aug. 29, 2019, provisional application No. 62/782,020, filed on Dec. 19, 2018.

(51) Int. Cl.
*C09J 163/04* (2006.01)
*C08G 59/42* (2006.01)
*C08G 59/62* (2006.01)
*C09J 163/00* (2006.01)

(52) U.S. Cl.
CPC .................... *C09J 163/04* (2013.01)

(58) Field of Classification Search
None
See application file for complete search history.

(56) References Cited

U.S. PATENT DOCUMENTS

| | | | |
|---|---|---|---|
| 3,404,018 A | 10/1968 | Hicks | |
| 3,621,074 A | 11/1971 | Siggel | |
| 5,356,715 A | 10/1994 | Levine | |
| 5,504,161 A * | 4/1996 | Marston | C08L 63/00 525/327.1 |
| 9,169,418 B2 | 10/2015 | Sakane | |
| 10,882,946 B2 | 1/2021 | Kaplan | |
| 11,066,550 B2 | 7/2021 | Kaplan | |
| 2004/0072963 A1 | 4/2004 | Sakane | |
| 2010/0041794 A1 | 2/2010 | Earls | |
| 2010/0126664 A1 | 5/2010 | O'Brien | |
| 2011/0288204 A1 | 11/2011 | Grablowitz | |
| 2016/0130393 A1 | 5/2016 | Liao | |
| 2017/0096522 A1 * | 4/2017 | Kobatake | C08K 5/527 |
| 2020/0157340 A1 * | 5/2020 | Miyatake | C08G 59/504 |

FOREIGN PATENT DOCUMENTS

| | | |
|---|---|---|
| CN | 101358122 A | 2/2009 |
| CN | 104212405 A | 12/2014 |
| CN | 104745138 A | 7/2015 |
| EP | 1512705 A1 | 3/2005 |
| EP | 2325221 A1 | 5/2011 |
| GB | 793915 A | 4/1958 |
| JP | H0148928 B2 | 10/1989 |
| JP | H0364529 B2 | 10/1991 |
| JP | H05320556 A | 12/1993 |
| KR | 100726684 B1 | 6/2007 |
| RU | 2457220 C1 | 7/2012 |
| WO | 2014072515 A1 | 5/2014 |
| WO | 2015160468 A1 | 10/2015 |
| WO | 2016105722 A1 | 6/2016 |
| WO | 2018038908 A1 | 3/2018 |
| WO | 2018182770 A1 | 10/2018 |

OTHER PUBLICATIONS

Ryan et al., "Networks by fast epoxy polymerization," Polymer Bulletin, vol. 24, pp. 521-527 (1990) (Year: 1990).*
Dow Product Information, "D.E.R. 330," pp. 1-5 (created 2010) (Year: 2010).*
Dow Product Information, "Voranol 2070," pp. 1-3 (created 2019) (Year: 2019).*
Covestro Product Information, "Arcol LG-56," pp. 1-2 (2014) (Year: 2014).*
Hexion Datasheet "EPON Resin 8150," pp. 1-3 (created 2015) (Year: 2015).*
Akkapeddi et al., "Chain Extension of PET and Nylon in an Extruder", Polym. Prepr. (Am. Chem. Soc., Div. Polym. Chem.) 29 (1988) 567-569.
Anzures et al., "The Effect of Polyester Polyol Structure on the Reactivity of Photocurable Epoxide Systems", RadTech Eur. 95 Conf. Proc. 574-583.
Arnebold et al., "Covalent integration of differently structured polyester polyols improves the toughness and strength of cationically polymerized, amorphous epoxy networks", J. Appl. Polym. Sci. 133 (2016) 43986.

(Continued)

*Primary Examiner* — Randy P Gulakowski
*Assistant Examiner* — Ha S Nguyen
(74) *Attorney, Agent, or Firm* — Dilworth IP, LLC

(57) ABSTRACT

One-component (1K) adhesive compositions ("PEEP" compositions) and a process for making them are disclosed. A polyepoxide is reacted with a polyether polyol composition, a polyester polyol composition, or both in the presence of a heat-activated Lewis acid catalyst at a temperature within the range of 100° C. to 220° C. for a time effective to cure the adhesive. The compositions are storage-stable under ambient conditions. Compared with conventional epoxy compositions, the 1K PEEP compositions offer improved room temperature lap shear strength, better resilience, and higher elongation. The 1K PEEP systems deliver a desirable balance of physical and mechanical properties while avoiding polyisocyanates and polyamine crosslinkers.

17 Claims, No Drawings

(56) References Cited

OTHER PUBLICATIONS

Blank et al., "Catalysis of the Epoxy-Carboxyl Reaction", J. Coat. Technol. 74 (2002) 33-41.
Crivello et al., "The Effects of Polyols As Chain Transfer Agents and Flexibilizers in Photoinitiated Cationic Polymerization", J. Radiat. Curing Oct. 1986, pp. 3-9.
Eaton, "Coating Crosslinking Reactions Using Cycloaliphatic Epoxides", Paint Coat. Ind. Jun. 1999, 76-80.
Haralabakopoulous et al., "Chain Extension of Poly(ethylene terephthalate) with Diepoxides by a Reactive Extrusion-Simulating Process", Polym. Prepr. (Am. Chem. Soc, Div. Polym. Chem.) 38 (1997) 168-169.
Harani et al., "Toughening of Epoxy Resin Using Hydroxyl-Terminated Polyesters", J. Appl. Polym. Sci. 71 (1999) 29-38.
PCT International Preliminary Report on Patentability dated Mar. 7, 2019 in corresponding Application No. PCT/US2017/045860, 7 pages.
PCT International Search Report and Written Opinion dated Oct. 23, 2017 in corresponding Application No. PCT/US2017/045860, 12 pages.
PCT International Search Report and Written Opinion of the International Searching Authority dated Nov. 23, 2017 in corresponding Application No. PCT/US2017/045867, 8 pages.
PCT International Search Report and Written Opinion of the International Searching Authority dated Oct. 20, 2017 in corresponding Application No. PCT/US2017/045865, 9 pages.
PCT International Search Report and Written Opinion of the International Searching Authority dated Oct. 23, 2017 in corresponding Application No. PCT/US2017/045860, 8 pages.
Raj et al., "Studies on Glass Reinforced Composites based on modified Epoxy Resin and Acrylic Acid System", Int. J. Plast. Technol. 9 (2005) 451.
Ratna et al., "Thermal and Mechanical Properties of a Hydroxyl-functional Dendritic Hyperbranched Polymer and Trifunctional Epoxy Resin Blends", Polym. Eng. Sci. 41 (2001) 1815.
Shalati et al., "High performance accelerated all acrylic coatings Kinetics and mechanistic aspects of non-isocyanate coatings", Prog. Org. Coat. 48 (2003) 236.
Shecter et al., "Glycidyl Ether Reactions with Alcohols, Phenols, Carboxylic Acids, and Acid Anhydrides", Ind. Eng. Chem. 48 (1956) 86.
Spyrou, "Radiation initiated cationic polymerization with", Prog. Org. Coat. 43 (2001) 25.
Tomuta et al., "New chemically reworkable epoxy coatings obtained by the addition of polyesters with star topologies to diglycidyl ether of bisphenol A resins", Prog. Org. Coat. 76 (2013) 1616.
Worzakowska, "Synthesis, Characterization, Thermal, and Viscoelastic Properties of an Unsaturated Epoxy Polyester Cured with Different Hardeners", J. Appl. Polym. Sci. 110 (2008) 3582.
Wu et al., "Kinetic modelling of crosslinking reactions for cycloaliphatic epoxides with hydroxyl- and carboxyl-functionalized acrylic copolymers: 1. pH and temperature effects", Polymer 39 (1999) 5747.
Xu et al., "Curing behavior and toughening performance of epoxy resins containing hyperbranched polyester", Polym. Adv. Technol. 15 (2004) 639.

* cited by examiner

ONE-COMPONENT ADHESIVE COMPOSITIONS

FIELD OF THE INVENTION

The invention relates to one-component adhesive compositions that are storage-stable and cure at elevated temperatures.

BACKGROUND OF THE INVENTION

Epoxy-functional compositions have long been known as building blocks for making epoxy resins. Reaction products of bisphenols and epichlorohydrin, for instance, are mainstays of the epoxy resin industry and have been sold for years as EPON® resins (Hexion Specialty Chemicals). Epoxy resins react with "hardeners" or other crosslinkers—usually polyamines, polycarboxylic acids, or polythiols—to give cured, high polymers for adhesives and other end-use applications. A challenge with most epoxy-based products is in making products having desirable flexibility at low cost while preserving other is important properties. Most epoxy-based products have relatively high glass-transition temperatures ($T_g$>80° C.) and low ultimate elongations (<5%).

Recently, we developed new classes of polyether/polyester-epoxide polymers ("polyether PEEPs" and "polyester PEEPs"; see WO 2018/182770 and WO 2018/038908, respectively). The polyether PEEPs are reaction products of a polyepoxide compound and a polyol composition comprising a polyether polyol. The polyether polyols have a hydroxyl value within the range of 150 to 800 mg KOH/g and an average hydroxyl functionality within the range of 3.5 to 8.0. The polyester PEEPs are reaction products of a polyepoxide compound and a polyester polyol composition. The polyester polyol has a hydroxyl value within the range of 50 to 400 mg KOH/g and an average hydroxyl functionality within the range of 1.5 to 4.0. The polyester-epoxide compositions retain many of the benefits of traditional epoxy resin-based products, but they have increased elongation and lower $T_g$. Both varieties of PEEP compositions are useful for coatings, elastomers, adhesives, sealants, and other valuable products and can be made without reliance on polyamines or polyisocyanates.

While the PEEP systems described previously are principally useful as two-component ("2K") systems (i.e., the reaction occurs at room temperature or somewhat elevated temperature when or soon after two reactive components are combined), some practical applications, particularly adhesives, require a one-component ("1K") system in which all of the reactants, including a heat-activated catalyst, can be stored together in one mixture without reacting until a reaction is needed.

Structural adhesives based on room temperature-cured or heat-cured epoxies are known. Polyamides, amidoamines, or aliphatic/aromatic amines are typical curing agents. In some cases, these products have poor resilience, low elongation, and/or low lap shear strength.

Structural adhesives are needed for high-strength, load-bearing applications to replace or supplement mechanical fasteners or welds. For metal, this translates to a lap shear strength greater than 2000 psi, and for other substrates, strengths greater than 1000 psi at bond failure. Relevant markets for structural adhesives include transportation, electronics, and building/construction, and these needs are now usually met with 2K epoxy or 2K urethane systems. Low-VOC, isocyanate-free, polyamine crosslinker-free alternatives to these systems are needed.

The industry would benefit from the availability of storage-stable, one-component epoxy-based products, particularly ones useful as structural adhesives. Desirably, the products would offer improved resilience and greater lap shear strength compared with a conventional epoxy 1K system. Preferably, the products could be made using commercially available or readily made starting materials, conventional equipment, and commonly used heat-cure conditions. Ideally, epoxy-based structural adhesives with excellent physical and mechanical properties could be realized without using polyisocyanates or polyamine curatives.

SUMMARY OF THE INVENTION

In one aspect, the invention relates to a process for making a one-component (1K) adhesive. The process comprises reacting a mixture comprising a polyepoxide compound, a polyol composition, and a heat-activated Lewis acid catalyst. The polyepoxide compound has an equivalent weight within the range of 125 to 250 g/eq. The polyol composition comprises: (i) a polyester polyol having a hydroxyl value within the range of 50 to 400 mg KOH/g, an average hydroxyl functionality within the range of 1.5 to 4.0, and an acid number less than 5 mg KOH/g; or (ii) a polyether polyol having a hydroxyl value within the range of 28 to 800 mg KOH/g and an average hydroxyl functionality within the range of 2.7 to 8.0; or (iii) a combination of (i) and (ii). The components are reacted at temperature within the range of 100° C. to 220° C. for a time effective to cure the adhesive.

In some aspects, the heat-activated Lewis acid catalyst is a complex of boron trifluoride and a primary aliphatic amine such as ethylamine.

The invention includes one-component adhesives, especially structural adhesives used by the construction and transportation industries, made by the process described above.

In other aspects, the invention includes heat-curable, one-component adhesive mixtures. These mixtures are curable at temperatures within the range of 100° C. to 220° C. and comprise the polyepoxide, polyols, and heat-activated Lewis acid catalyst described above.

We found that one-component adhesives having excellent lap shear strength and flexibility can be made by including a heat-activated Lewis acid catalyst in a PEEP system. The one-component PEEP compositions complement the 2K systems curable at room temperature or elevated temperature that we described earlier. The 1K systems are desirable for fully formulated products intended to be stored before use, such as the structural adhesives used for construction and automotive applications. Compared with conventional epoxy 1K compositions, the 1K PEEP compositions offer improved room temperature lap shear strength, better resilience, and higher elongation. The inventive 1K systems deliver a desirable balance of physical and mechanical properties while avoiding polyisocyanates or polyamine crosslinkers.

DETAILED DESCRIPTION OF THE INVENTION

In one aspect, the invention relates to a process for making a one-component (1K) adhesive by reacting a polyepoxide compound and a composition comprising a polyol in the presence of a heat-activated Lewis acid catalyst.

The Polyepoxide Compound

Suitable polyepoxide compounds have two or more epoxide groups per molecule and an equivalent weight within the range of 125 to 250 g/eq., or in some aspects 150 to 240 g/eq. or 190 to 235 g/eq.

In preferred aspects, the polyepoxide compounds have an average of 2 to 4 epoxide groups per molecule ("average epoxide functionality"). In some aspects, the average epoxide functionality is from 2 to 3, 2.0 to 2.8, or about 2.

Some suitable polyepoxide compounds are commercially available, while others are readily synthesized from the reaction of epichlorohydrin and a suitable polyol or polyamine precursor, preferably from epichlorohydrin and an aromatic or cycloaliphatic polyol or polyamine.

In some aspects, the polyepoxide compound is a reaction product of a bisphenol (e.g., bisphenol A, bisphenol AP, bisphenol BP, bisphenol C, bisphenol F, bisphenol S, bisphenol Z, or the like) and epichlorohydrin. In other aspects, the polyepoxide compound is the reaction product of a hydrogenated bisphenol and epichlorohydrin. In other words, in some cases the polyepoxide compound is a "diglycidyl ether" of the bisphenol or hydrogenated bisphenol. Many of these materials are commercially available. For instance, suitable polyepoxide compounds include the EPON® 800 series of epoxy resins (products of Hexion Specialty Chemicals), mostly from bisphenol A or bisphenol F, such as EPON® resins 825, 826, 828, 830, 834, 862, and the like. Suitable bisphenol F-based resins also include EPALLOY® 8220, EPALLOY® 8230, and EPALLOY® 8240, products of CVC Thermoset Specialties. EPON® 828 and EPALLOY® 8240 resins are particularly preferred.

Suitable epoxide compounds include bisphenol diglycidyl ethers in which the aromatic rings have been hydrogenated, such as EPALLOY® 5000 and EPALLOY® 5001, or modified with alkyl or functional groups, such as EPALLOY® 7200. Suitable polyepoxide compounds include di-, tri-, or tetrafunctional aromatic polyepoxides such as resorcinol diglycidyl ether (available as ERISYS™ RDGE from CVC Thermoset Specialties), the triglycidyl ether of tris(hydroxyphenyl)ethane (available, for instance, as EPALLOY® 9000), and the tetraglycidyl ether of m-xylenediamine (available as ERISYS™ GA 240). Suitable polyepoxide compounds also include aromatic and cycloaliphatic glycidyl esters, such as the diglycidyl ester of isophthalic acid, phthalic acid, or terephthalic acid and hydrogenated versions thereof, such as hexahydrophthalic acid diglycidyl ester (available, for instance, as EPALLOY® 5200).

In some aspects, the polyepoxide compound is an aliphatic diglycidyl ether, particularly aliphatic diglycidyl ethers having average epoxide functionalities of at least 2, preferably at least 3. Suitable aliphatic diglycidyl ethers include, for example, 1,4-butanediol diglycidyl ether, 1,4-cyclohexanediol diglycidyl ether, neopentyl glycol diglycidyl ether, ethylene glycol diglycidyl ether, 2-methyl-1,3-propanediol diglycidyl ether, 1,6-hexanediol diglycidyl ether, dipropylene glycol diglycidyl ether, glycerol triglycidyl ether, trimethylolpropane triglycidyl ether, pentaerythritol tetraglycidyl ether, and the like, and mixtures thereof. Suitable polyepoxide compounds of this type are easily made by reacting the polyols with excess epichlorohydrin; many are commercially available from CVC Thermoset Specialties under the ERISYS™ mark or from other suppliers.

Mixtures of various types of polyepoxide compounds can be used. In preferred aspects, the polyepoxide compound comprises at least 50 wt. %, at least 60 wt. %, or at least 75 wt. %, of an aromatic polyepoxide compound, a cycloaliphatic polyepoxide compound, or a combination thereof.

The polyepoxide compound is used in an amount such that the ratio of epoxy equivalents of the polyepoxide compound to hydroxyl equivalents of the polyol composition (also described herein as the "epoxy/OH eq. ratio") is within the range of 1:1 to 6:1. In other aspects, the ratio of epoxy to hydroxyl equivalents will range from 2:1 to 6:1, from 2:1 to 5:1, or from 2.5:1 to 3.5:1. The "epoxy/OH index" or "index" referred to herein is the epoxy/OH eq. ratio multiplied by 100.

The amount of polyepoxide compound used can vary and will depend on many factors, including the nature of the polyepoxide compound, the nature of the polyol composition, the desired stoichiometry, and other factors. In general, however, the amount of polyepoxide compound will be within the range of 20 to 95 wt. %, 40 to 85 wt. %, or 55 to 80 wt. %, based on the amount of PEEP composition.

The Polyol Composition

Polyester Polyols

The 1K PEEP compositions are reaction products of the polyepoxide compound described above and a polyol composition. In a preferred aspect, the polyol composition comprises a polyester polyol, especially an aromatic polyester polyol.

Suitable polyester polyols are well known and include aromatic and aliphatic polyester polyols. These polyols are terminated with hydroxyl groups and generally have low acid numbers (i.e., below 5 mg KOH/g). Suitable polyester polyols are readily synthesized by condensation polymerization of dicarboxylic acids, esters, or anhydrides with low molecular weight diols, polyols, or their mixtures. Suitable dicarboxylic acids, esters, or anhydrides include, for example, phthalic anhydride, isophthalic acid, terephthalic acid, dimethyl terephthalate, trimellitic anhydride, maleic anhydride, succinic anhydride, succinic acid, dimethyl succinate, diethyl adipate, glutaric acid, adipic acid, sebacic acid, suberic acid, and the like, and combinations thereof. Suitable diols and polyols useful for making polyester polyols include, for example, ethylene glycol, propylene glycol, 2-methyl-1,3-propanediol, 1,4-butanediol, 1,6-hexanediol, diethylene glycol, dipropylene glycol, triethylene glycol, tripropylene glycol, neopentyl glycol, 1,4-cyclohexanedimethanol, glycerin, trimethylolpropane, trimethylolethane, pentaerythritol, and the like, and combinations thereof.

Many suitable polyester polyols for use herein are commercially available from Stepan Company and other polyol suppliers. Examples include the STEPANPOL® PS-, PC-, PD-, PH-, PHN-, PN-, and AA-series polyols, products of Stepan. Particular examples include STEPANPOL® PS-2402, STEPANPOL® PS-3021, STEPANPOL® PS-3524, STEPANPOL® PC-1028-210, and STEPANPOL® PC-1028-110 (aromatic polyester polyols) and STEPANPOL® AA-58, STEPANPOL® PS-201-165, STEPANPOL® PC-1011P-210, STEPANPOL® PC-102-110, STEPANPOL® PC-105-110, STEPANPOL® PC-1040-55, and STEPANPOL® PC-5080-110 (aliphatic polyester polyols). Other commercially available products include TERATE® and TERRIN™ polyols from INVISTA, TEROL® polyols from Huntsman, LUPRAPHEN® polyols from BASF, DESMOPHEN® polyols from Covestro, FOMREZ® polyols from Chemtura, and DIEXTER™ polyols from Coim.

In suitable polyol compositions, the polyester polyol will have a hydroxyl value within the range of 50 to 400 mg KOH/g. In some aspects, the polyester polyol will have a hydroxyl value within the range of 60 to 350 mg KOH/g, or within the range of 100 to 250 mg KOH/g.

The polyester polyols will have average hydroxyl functionalities within the range of 1.5 to 4.0. In some aspects, the polyester polyol will have an average hydroxyl functionality within the range of 1.6 to 3.5 or 1.8 to 3.0.

The polyester polyols have mostly hydroxyl end groups, not carboxylic acid end groups, and consequently will have low acid numbers, i.e., less than 5 mg KOH/g. In some aspects, the polyester polyols will have acid numbers less than 3 mg KOH/g, less than 2 mg KOH/g, or less than 1 mg KOH/g.

Polyether Polyols

In some aspects, the polyol composition comprises a polyether polyol, especially a high-functionality polyether polyol. Suitable polyether polyols have average hydroxyl functionalities within the range of 2.7 to 8.0, from 3.0 to 8.0, or from 3.5 to 8.0. These polyols are readily synthesized by ring-opening polymerization of propylene oxide, ethylene oxide, butylene oxides, tetrahydrofuran, or mixtures thereof, in the presence of suitable hydroxy- and/or amine-functional initiators. In some cases, the reactions are catalyzed by bases (e.g., KOH), transition metal catalysts (e.g., double metal cyanide catalysts), Lewis acids (e.g., $BF_3$ catalysts) or the like. A variety of diols, triols, and higher functionality starters can be used alone or in combination provided that the average hydroxyl functionality of the polyol is between 2.7 and 8.0. In some aspects, sucrose, sorbitol, or another high-functionality starter is used alone or in combination with a diol (e.g., ethylene glycol, diethylene glycol), triol (e.g., glycerin, trimethylolpropane, triethanolamine), or amine starter (e.g., ethylene diamine) to achieve a high targeted functionality within the range of 3.5 to 8.0.

Many suitable polyether polyols having average hydroxyl functionalities within the range of 2.7 to 8.0, particularly polyethers initiated by triol and higher functionality starters, are commercially available from Dow Chemical, Covestro, Huntsman, Carpenter, and other suppliers.

Examples of the high-functionality (3.5 to 8.0) polyols include the MULTRANOL® products from Covestro (e.g., MULTRANOL® 4030, MULTRANOL® 4034, MULTRANOL® 4035, MULTRANOL® 4050, MULTRANOL® 4063, MULTRANOL® 6501, MULTRANOL® 8162, MULTRANOL® 8164, MULTRANOL® 9181, and MULTRANOL® 9196), the CARPOL® products from Carpenter (CARPOL® GSP-280, CARPOL® GSP-355, CARPOL® GSP-520, CARPOL® SP-477, CARPOL® SPA-357, CARPOL® SPA-530, CARPOL® EDAP-770, and CARPOL® EDAP-800), the VORANOL® products from Dow Chemical (VORANOL® 280, VORANOL® 370, and VORANOL® 490), and the JEFFOL® products from Huntsman (JEFFOL® S-490, JEFFOL® SA-499, JEFFOL® SD-361, JEFFOL® SD-441, JEFFOL® SG-360, and JEFFOL® SG-522).

In suitable polyol compositions, the polyether polyol will have a hydroxyl value within the range of 28 to 800 mg KOH/g. In some aspects, the polyether polyol will have a hydroxyl value within the range of 56 to 550 mg KOH/g, or within the range of 112 to 400 mg KOH/g.

The polyol compositions can include polycarbonate polyols or other kinds of polyols in addition to the polyester polyol and/or polyether polyol. In general, the polyol composition comprises at least 50 mole %, in some aspects at least 65 mole % or at least 80 mole %, of one or more polyester or polyether polyols. In some aspects, the polyol composition will consist of or consist essentially of one or more polyester polyols. In other aspects, the polyol composition will consist of or consist essentially of one or more polyether polyols.

The amount of polyester polyol and/or polyether polyol composition used can vary and will depend on many factors, including the nature of the polyepoxide compound, the nature of the polyol composition, the desired stoichiometry, and other factors. In general, however, the amount of polyol composition will be within the range of 5 to 80 wt. %, 15 to 60 wt. %, or 20 to 45 wt. %, based on the amount of PEEP composition.

Heat-Activated Lewis Acid Catalyst

Suitable heat-activated Lewis acid catalysts include an electron pair acceptor such as aluminum chloride, aluminum bromide, zinc chloride, boron trichloride, boron trifluoride, tin tetrachloride, antimony pentachloride, and the like, with boron trifluoride as especially preferred.

The electron pair acceptor is bonded or strongly associated with an electron donor such that under ambient or warm conditions, the Lewis acid is essentially unreactive as a catalyst for hydroxyl-epoxide reactions. Suitable electron donors include primary and secondary amines, which strongly associate with many Lewis acids, including boron trifluoride, under these conditions.

The catalyst is "heat-activated," i.e., it melts, dissolves, or dissociates to generate a species capable of catalyzing a reaction between an epoxide group of an epoxide compound and a hydroxyl group of a polyol at temperatures greater than 60° C. or 70° C., especially greater than 90° C. or 100° C.

Complexes of boron trifluoride and primary or secondary aliphatic or aromatic amines are preferred and many are commercially available from Laborchemie Apolda GmbH and other suppliers. Thus, suitable $BF_3$-amine catalysts include complexes of boron trifluoride with ethylamine, di-n-butylamine, isopropylamine, piperidine, isophorone diamine, N-methylcyclohexylamine, benzylamine, aniline, N-methylaniline, and 2,4-dimethylaniline. Complexes of $BF_3$ with primary aliphatic amines, particularly ethylamine ("monoethylamine," "MEA") are preferred. In some cases, the $BF_3$-amine catalysts are supplied (or can be supplied) as mixtures with a polyol such as polyethylene glycols, polyester polyols, or other polyols.

The amount of heat-activated Lewis acid catalyst needed will depend on the nature of the epoxy compound, the nature of the polyol composition, the epoxy/hydroxyl index, the curing temperature, the particular catalyst used, and other factors. Generally, however, the amount used will be within the range of 0.1 to 10 wt. %, 1 to 5 wt. %, or 1.5 to 3.5 wt. % based on the amount of PEEP composition.

Curing Conditions

A one-component system comprising a mixture of the polyepoxide compound and the composition comprising a polyol are reacted in the presence of a heat-activated Lewis acid catalyst at temperature within the range of 100° C. to 220° C., or from 130° C. to 210° C., or from 160° C. to 200° C., for a time effective to cure the adhesive. Cure times depend on the curing temperature, catalyst level, epoxy/hydroxyl index, the desired working time, and other factors. Typically, however, cure times are within the range of several minutes to an hour, such as 10, 20, 30, 40, 50, or 60 minutes. As shown in Table 3, choosing a 200° C. curing temperature can give fully cured adhesives in as little as 10 minutes.

Adhesive Compositions

The reaction of the polyepoxide compound and the polyol composition provides a polyester-epoxide or polyether-epoxide polymer ("PEEP") adhesive composition. The PEEP compositions are distinguishable from conventional epoxy adhesives in having a unique balance of properties.

For instance, the inventive adhesive compositions will have a relatively low glass-transition temperature ($T_g$), as measured by differential scanning calorimetry (DSC), within the range −20° C. to 80° C. In some aspects, the $T_g$ of the PEEP composition will be within the range of 0° C. to 60° C., or within the range of 10° C. to 50° C., or within the range of 20° C. to 40° C.

When compared with conventional epoxy adhesives, the inventive adhesive compositions have increased ultimate elongations (i.e., "elongation at break," hereinafter simply "elongation"). In some aspects, the PEEP compositions will have elongations (as measured by ASTM D412, Method A) of at least 3%, at least 10%, at least 40%. In other aspects, the PEEP compositions will have elongations within the range of 3% to 60% or from 10% to 30%.

The adhesive compositions can include additives such as fillers, pigments, flame retardants, viscosity modifiers, reactive diluents, adhesion promoters, moisture scavengers, plasticizers, flexibilizers, and the like. The type and amount of additive used will depend on the requirements of the specific adhesive application.

In some aspects, the adhesive compositions normally will have increased resilience compared with conventional epoxy adhesives as reflected by higher total energy absorption ("T.E.A.") values as determined hereinbelow. The T.E.A. values will typically range from 10 to 300 lb.·in./in.$^2$, 10 to 200 lb.·in./in.$^2$, or 20 to 150 lb.·in./in.$^2$. The units are commonly written as "lb./in."

The following examples merely illustrate the invention; the skilled person will recognize many variations that are within the spirit of the invention and scope of the claims.

Formulation Components:

Note: Hydroxyl values, functionalities, molecular weights, and viscosities are nominal or approximate values.

EPON® 828 (Hexion Specialty Chemicals): a liquid bisphenol A diglycidyl ether-based epoxy resin. Ave. eq. wt.: 189. Viscosity: 13,000 cP at 25° C.

EPALLOY® 8240 (CVC Thermoset Specialties): an epoxy phenol novolac resin. Ave. eq. wt.: 170. Viscosity: 6000-7100 cP at 25° C.

STEPANPOL® PC-1028P-210 (Stepan Company): aromatic polyester polyol from 1,6-hexandiol and phthalic anhydride. OH value: 210 mg KOH/g. Functionality: 2.0.

IPA-HDO polyol: aromatic polyester polyol from isophthalic acid and 1,6-hexanediol. OH value: 115 mg KOH/g. Functionality: 2.0.

AA-BDO polyol: aliphatic polyester polyol from adipic acid and 1,4-butanediol. OH value: 215 mg KOH/g. Functionality: 2.0.

STEPANPOL® PS-201-165 (Stepan): aliphatic polyester polyol, OH value: 157-173 mg KOH/g. Functionality: 2.0.

STEPANPOL® PC-1011P-210 (Stepan): aliphatic polyester polyol, OH value: 195-225 mg KOH/g. Functionality: 2.0.

VORANOL® 370 (Dow): glycerin/sucrose-initiated polyether polyol. Functionality: 7.0.

MULTRANOL® 4030 (Covestro): sucrose-based polyol, OH value: 370-390 mg KOH/g.

MULTRANOL® 4034 (Covestro): sucrose-based polyol, OH value: 450-490 mg KOH/g, molecular weight 635.

CARPOL® PGP-1000 (Carpenter): polypropylene glycol, mol. wt. 1000.

BF$_3$-MEA catalyst: heat-activated catalyst. Complex of boron trifluoride and ethylamine that becomes active in the inventive 1K adhesive systems at temperatures greater than 100° C.

Preparation of IPA-HDO Polyol

Isophthalic acid (2354 g) and 1,6-hexanediol (2156 g) are charged to a flask equipped with an overhead stirrer, stir shaft, thermocouple, nitrogen sparge tube, and distillation head. The contents are heated to 220° C. under nitrogen. During the condensation reaction, titanium tetrabutoxide (1.17 g) is added, and the reaction continues until the acid value of the polyol product is less than 1 mg KOH/g. Hydroxyl value: 116 mg KOH/g. Acid value: 0.4 mg KOH/g.

Preparation of AA-BDO Polyol

Adipic acid (2246 g) and 1,4-butanediol (2008 g) are charged to a flask equipped with an overhead stirrer, stir shaft, thermocouple, nitrogen sparge tube, and distillation head. The contents are heated under nitrogen to 180° C., then gradually to 220° C. When the acid value reaches 9 mg KOH/g, tin(II) chloride (0.74 g) is added, and heating continues until the acid value of the product is less than 0.5 mg KOH/g. The measured hydroxyl number is 176 mg KOH/g. Additional 1,4-butanediol (120 g) is added, and the mixture is digested at 220° C. for 1 h. Hydroxyl value: 215 mg KOH/g. Acid value: 0.46 mg KOH/g.

Comparative Examples 1-3

Preparation of Epoxy Standards

Control formulations are prepared by mixing the appropriate amount (see Table 2) of epoxy resin (EPON® 828 resin, product of Hexion, or EPALLOY® 8240, product of CVC Thermoset Specialties) with boron trifluoride-ethylamine complex (BF$_3$-MEA) in a glass jar. The BF$_3$-MEA is added to the epoxy resin, and the mixture is heated to 65° C. to 77° C. with occasional stirring with a metal spatula. When the mixture becomes homogeneous, it is allowed to cool to room temperature and is then used for lap shear and mechanical testing.

Examples 4-21 and Comparative Examples C1-C3 and C22

Preparation of PEEP Adhesive Composition

1K PEEP formulations are prepared by mixing in a glass jar the appropriate amounts of polyol and BF$_3$-MEA needed to achieve a targeted index (see Tables A and 1-9). The BF$_3$-MEA is added to the polyol, and the mixture is heated to 65° C. to 77° C., with occasional stirring with a metal spatula. When the mixture becomes homogeneous, it is allowed to cool to room temperature. The polyol/catalyst blend is then mixed with the appropriate amount of epoxy resin, and physical/mechanical properties of cured adhesive products made from this mixture are subsequently evaluated.

1K Adhesive Sample Preparation

The procedure of ASTM D-1002 is generally followed. Samples of the mixtures described above are applied to a 1"×1" area of a cold-rolled steel (CRS) coupon (Q-Panel® RS-14; 0.063"×1"×4", product of Q-Lab Corp.). The coupons are wiped with acetone prior to use. For the 80° C. lap shear testing, a hole is drilled into one of the coupons prior to bonding. After the mixture is applied to one of the coupons, the coated portion is sprinkled with 10-mil glass beads to provide even substrate spacing. A second test coupon is placed on top of the first coupon to form a 1-in$^2$ overlap section sandwiching the liquid adhesive. A binder clip is affixed across the overlap area, and excess adhesive is removed. Samples are heated at 160° C., 180° C., or 200° C. for curing times of 10, 20, 30, 40, 50, or 60 minutes. Three to five samples are produced and tested under identical conditions, and the results are averaged. The samples are allowed to cool to room temperature and are placed in a 25° C./50% relative humidity room for 1 hour prior to adhesive strength testing. Results of these tests appear in Tables 1-3, 6, and 8.

Plaque Preparation

Plaques used for mechanical property measurements are produced by pouring about 110 g of 1K PEEP reaction mixture into 7"×7"×0.1" preheated molds (coated with mold release). The 1K PEEP systems are heated to 160° C. for 40 to 60 min. to ensure cure. Plaques are removed from the mold while still warm and are allowed to cool to room temperature. The 1K PEEP test dogbone samples are prepared using a die punch (5.5"×0.5"). Due to the brittleness of the epoxy comparative systems and the inherent difficulty to cut samples, a dogbone shaped mold is employed for these samples. This mold is heated to 180° C. for 40 min to ensure cure. All samples are conditioned at 25° C. and 50% relative humidity for 1 h prior to physical testing.

1K Adhesive Testing

Lap shear strength is measured using an Instron universal testing machine (MTS ReNew™ system) and TestWorks® 4.11 software. The binder clip is removed and the non-adhered ends of the metal coupon strips are secured in Instron 30 kN metal test grips (model #2716-015) affixed to the testing apparatus. The assembly is then pulled in the tensile direction at 0.05 in/min until overlap bond failure occurs. The peak stress at failure is measured and averaged for each polymer system.

Mechanical Properties

Peak stress, modulus, and elongation are determined generally in accord with ASTM D412-16.

Total energy absorbed ("T.E.A.") is calculated by the universal testing machine software (Testworks 4.11) and obtained by normalizing the area under the stress-strain curve by the surface area of the central test portion (tapered portion) of the dogbone sample. The area under the stress-strain curve is calculated from the product of the total force (pounds) required to produce extension of the sample up to breakage (inches). For each sample, the surface area is 0.825 in.$^2$. Total energy absorbed is a measurement that allows for comparison of the relative toughness of each sample tested. The units of T.E.A. are lb.·in./in.$^2$ (or lb./in.).

Hardness

Hardness of cured polymer samples is determined using a Type A durometer (Pacific Transducer, Model 306L) according to ASTM 2240-85. The dogbone samples described earlier are used.

Mechanical properties and hardness measurements are performed at 23° C.±1° C. and 50% relative humidity.

Glass-Transition Temperature

Glass-transition temperatures ($T_g$) are determined using a TA Instruments Discovery Series differential scanning calorimeter and Trios (V3.2) software from TA Instruments. Samples are prepared by trimming a 10-20 mg piece from the cast adhesive plaques. The sample is accurately weighed, crimped in the test pan, and placed in the sample holder of the instrument along with a reference pan. The sample is cooled to −50° C. and then warmed from −50° C. to 150° C. at 10° C. per minute. The 1K polyester-epoxide polymer samples exhibited a strong $T_g$ signal with a midpoint generally within the range of 20° C. to 80° C.

Results:

All of the tested systems demonstrate cohesive failure, i.e., the adhesive splits, and adhesive residue remains on both metal coupons.

Overall, the results in Tables 1-3, 6, and 8 show that greater concentrations of catalyst, higher index (ratio of epoxy to hydroxyl equivalents), and higher curing temperatures generally promote more rapid development of lap shear adhesive strength, which can be expected. Room temperature lap shear strength of systems based only on EPON® 828 and catalyst provide a maximum lap shear strength of about 1700 psi under optimum conditions. In contrast, the inventive 1K PEEP systems based on aromatic polyester polyols reach lap shear strengths of about 3500 psi, or roughly double that of the EPON® 828-only comparative examples. A similar dramatic improvement is seen in each of Tables 1-3 when comparing epoxies made using only EPALLOY® 8240 (Comparative Example 3) with a 1K PEEP system incorporating EPALLOY® 8240 (Example 12). There was no way to predict these outcomes in advance of making and testing the samples.

As shown in Table 4, when the lap shear tests are performed at 80° C. instead of room temperature, the results are variable. Overall, adhesive strength of the 1K PEEP systems based on aromatic polyester polyols is reduced, which might be expected based on the relatively low $T_g$ values of these 1K PEEP compositions (see Table 5).

In addition to the lower $T_g$ values, plaques made from the 1K PEEP adhesive systems based on aromatic polyester polyols generally demonstrate higher tensile strength (peak stress), higher elongation, and greater resilience (as evidenced by higher TEA values) when compared with the EPON® 828-only or EPALLOY® 8240-only comparative compositions (Table 5).

The results in Table 5 demonstrate that the PEEP formulation and curing conditions can be tailored to provide products having a desirably wide range of strength and flexibility properties. For instance, products can be made with high peak stress and stiffness at modest elongation (see Table 5, Examples 4-4D) or at somewhat lower peak stress and stiffness with much higher elongation (Table 5, Examples 6 and 8).

Results with aliphatic polyester polyols appear in Tables 6 and 7. As shown in Table 6, excellent lap shears develop within 20 min. at a cure temperature of 200° C. or within 30 min. at a cure temperature of 180° C. Curing at 160° C. extends working time, with properties well developed at 60 min. The cast adhesive results in Table 7 suggest that a single aliphatic polyester polyol can deliver different attributes that depend on index and curing conditions. For example, a more flexible product can be made by reducing index or reducing the cure temperature (see Examples 14A, 14B, and 15).

With polyether polyols, higher functionalities provide desirable crosslinking and development of acceptable lap shear properties. Table 8 shows faster development of lap shear strength at higher cure temperatures and overall better properties when compared with the epoxy-only systems (Comparative Examples 1 and 2). Table 9 again underscores the need for adequate hydroxyl functionality. High stiffness can be retained while improving elongation when a polyether polyol is included with the epoxy resin.

TABLE A

1K Adhesive Formulations

| Ex. | Epoxy | Polyol | Index | % BF3-MEA | Wt. % epoxy | Wt. % polyol |
|---|---|---|---|---|---|---|
| 4 | EPON ® 828 | PC-1028P-210 | 339 | 3.3 | 69.0 | Tin |
| 5 | EPON ® 828 | PC-1028P-210 | 317 | 1.5 | 68.8 | 29.7 |
| 6 | EPON ® 828 | PC-1028P-210 | 500 | 3.3 | 75.8 | 20.9 |
| 7 | EPON ® 828 | PC-1028P-210 | 542 | 1.5 | 78.7 | 19.8 |
| 8 | EPON ® 828 | IPA-HDO polyol | 352 | 3.3 | 55.3 | 41.4 |
| 9 | EPON ® 828 | IPA-HDO polyol | 500 | 3.3 | 63.2 | 33.5 |
| 10 | EPON ® 828 | PC-1028P-210 | 603 | 3.3 | 78.7 | 18.0 |
| 11 | EPON ® 828 | IPA-HDO polyol | 624 | 3.3 | 67.9 | 28.9 |
| 12 | EPALLOY ® 8240 | PC-1028P-210 | 338 | 3.3 | 67.2 | 29.5 |
| 13 | EPON ® 828 | PS-201-165 | 300 | 3.3 | 61.1 | 35.6 |
| 14 | EPON ® 828 | PC-1011P-210 | 300 | 3.3 | 66.4 | 30.3 |
| 15 | EPON ® 828 | PC-1011P-210 | 400 | 3.3 | 72.1 | 24.6 |
| 16 | EPON ® 828 | AA-BDO polyol | 300 | 3.3 | 66.0 | 30.7 |
| 17 | EPON ® 828 | PC-201-165 | 300 | 3.3 | 61.1 | 35.6 |
| 18 | EPON ® 828 | VORANOL ® 370 | 400 | 3.3 | 80.6 | 16.2 |
| 19 | EPON ® 828 | MULTRANOL ® 4030 | 400 | 3.3 | 80.5 | 16.2 |
| 20 | EPON ® 828 | MULTRANOL ® 4034 | 400 | 3.3 | 83.4 | 13.3 |
| 21 | EPON ® 828 | MULTRANOL ® 4034 | 300 | 3.3 | 79.7 | 17.0 |
| C22 | EPON ® 828 | CARPOL ® PGP-1000 | 300 | 3.3 | 50.0 | 46.7 |

TABLE 1

Room-Temperature CRS Lap Shear Results: Samples Cured at 160° C., Aromatic Polyester Polyols

| Ex. | Epoxy[3,4] | Polyester polyol[1,2] | Index | BF3-MEA wt. % | Lap shear strength, psi (avg) | | | | | |
|---|---|---|---|---|---|---|---|---|---|---|
| | | | | | 10 min. | 20 min. | 30 min. | 40 min. | 50 min. | 60 min. |
| C1 | EPON ® 828 | N/A | N/A | 3.3 | 8.8 | 1372 | 1116 | 1072 | 923 | 893 |
| C2 | EPON ® 828 | N/A | N/A | 1.5 | 12 | 1040 | 1547 | 1617 | 1476 | 1380 |
| C3 | EPALLOY ® 8240 | N/A | N/A | 3.3 | 22 | 1968 | 1534 | 1230 | 1140 | 1148 |
| 4 | EPON ® 828 | PC-1028P-210 | 339 | 3.3 | 0 | 424 | 2371 | 2131 | 2106 | 1900 |
| 5 | EPON ® 828 | PC-1028P-210 | 500 | 3.3 | 0 | 1341 | 2092 | 1859 | 1754 | 1602 |
| 6 | EPON ® 828 | PC-1028P-210 | 317 | 1.5 | 0 | 230 | 2914 | 3198 | 3506* | 3495* |
| 7 | EPON ® 828 | PC-1028P-210 | 542 | 1.5 | 0 | 2412 | 3008 | 3509 | 2652 | 2384 |
| 8 | EPON ® 828 | IPA-HDO polyol | 352 | 3.3 | 8.2 | 2408 | 3170 | 2526 | 2887 | 2534 |
| 9 | EPON ® 828 | IPA-HDO polyol | 500 | 3.3 | — | 1845 | 2224 | 2131 | 2084 | 1925 |
| 10 | EPON ® 828 | PC-1028P-210 | 603 | 3.3 | 0 | 2192 | 2426 | 2192 | 1679 | 1491 |
| 11 | EPON ® 828 | IPA-HDO polyol | 624 | 3.3 | 3.9 | 1773 | 2388 | 1860 | 2004 | 1781 |
| 12 | EPALLOY ® 8240 | PC-1028P-210 | 338 | 3.3 | 0 | 454 | 3270 | 3136 | 2969 | 2806 |

[1]STEPANPOL ® PC-1028P-210 is a product of Stepan Company.
[2]IPA-HDO polyol = isophthalic acid/1,6-hexanediol developmental polyol.
[3]EPON ® 828 is a product of Hexion Specialty Chemicals.
[4]EPALLOY ® 8240 is a product of CVC Thermoset Specialties.
CRS = cold-rolled steel.
*metal coupon distorts.

TABLE 2

Room-Temperature CRS Lap Shear Results: Samples Cured at 180° C., Aromatic Polyester Polyols

| Ex. | Epoxy[3,4] | Polyester polyol[1,2] | Index | BF3-MEA wt. % | Lap shear strength, psi (avg) | | | | | |
|---|---|---|---|---|---|---|---|---|---|---|
| | | | | | 10 min. | 20 min. | 30 min. | 40 min. | 50 min. | 60 min. |
| C1 | EPON ® 828 | N/A | N/A | 3.3 | 383 | 1017 | 854 | 956 | 871 | 902 |
| C2 | EPON ® 828 | N/A | N/A | 1.5 | 538 | 1618 | 1649 | 1700 | 1700 | 1725 |
| C3 | EPALLOY ® 8240 | N/A | N/A | 3.3 | 1344 | 1250 | 1060 | 1166 | 1144 | 1047 |
| 4 | EPON ® 828 | PC-1028P-210 | 339 | 3.3 | 0 | 2715 | 2422 | 2048 | 2147 | 2152 |
| 5 | EPON ® 828 | PC-1028P-210 | 500 | 3.3 | 17 | 2068 | 1755 | 1636 | 1663 | 1621 |
| 6 | EPON ® 828 | PC-1028P-210 | 317 | 1.5 | 0 | 2440 | 3294 | 3000 | 2832 | 2741 |
| 7 | EPON ® 828 | PC-1028P-210 | 542 | 1.5 | 0 | 3534* | 2697 | 2868 | 2660 | 2485 |

TABLE 2-continued

Room-Temperature CRS Lap Shear Results: Samples Cured at 180° C., Aromatic Polyester Polyols

| Ex. | Epoxy[3,4] | Polyester polyol[1,2] | Index | BF$_3$-MEA, wt. % | Lap shear strength, psi (avg) | | | | | |
|---|---|---|---|---|---|---|---|---|---|---|
| | | | | | 10 min. | 20 min. | 30 min. | 40 min. | 50 min. | 60 min. |
| 8 | EPON ® 828 | IPA-HDO polyol | 352 | 3.3 | 6.8 | 3402 | 2786 | 2944 | 2778 | 2893 |
| 9 | EPON ® 828 | IPA-HDO polyol | 500 | 3.3 | — | 2135 | 2064 | 2086 | 2102 | 1924 |
| 12 | EPALLOY ® 8240 | PC-1028P-210 | 338 | 3.3 | 0 | 3408 | 2459 | 2502 | 2596 | 2407 |

[1]STEPANPOL ® PC-1028P-210 is a product of Stepan Company.
[2]IPA-HDO polyol = isophthalic acid/1,6-hexanediol developmental polyol.
[3]EPON ® 828 is a product of Hexion Specialty Chemicals.
[4]EPALLOY ® 8240 is a product of CVC Thermoset Specialties.
CRS = cold-rolled steel.
*metal coupon distorts.

TABLE 3

Room-Temperature CRS Lap Shear Results: Samples Cured at 200° C., Aromatic Polyester Polyols

| Ex. | Epoxy[3,4] | Polyester polyol[1,2] | Index | BF$_3$-MEA, wt. % | Lap shear strength, psi (avg) | | | | | |
|---|---|---|---|---|---|---|---|---|---|---|
| | | | | | 10 min. | 20 min. | 30 min. | 40 min. | 50 min. | 60 min. |
| C1 | EPON ® 828 | N/A | N/A | 3.3 | 852 | 913 | 929 | 970 | 992 | 995 |
| C2 | EPON ® 828 | N/A | N/A | 1.5 | 920 | 1551 | 1695 | 1620 | 1707 | 1588 |
| C3 | EPALLOY ® 8240 | N/A | N/A | 3.3 | 1387 | 1029 | 953 | 1057 | 883 | 1148 |
| 4 | EPON ® 828 | PC-1028P-210 | 339 | 3.3 | 77 | 2114 | 2165 | 2088 | 2166 | 1977 |
| 5 | EPON ® 828 | PC-1028P-210 | 500 | 3.3 | 2035 | 1544 | 1466 | 1471 | 1473 | 1397 |
| 6 | EPON ® 828 | PC-1028P-210 | 317 | 1.5 | 2919 | 3202 | 2945 | 2833 | 2685 | 2729 |
| 7 | EPON ® 828 | PC-1028P-210 | 542 | 1.5 | 3527* | 2897 | 2595 | 2351 | 2345 | 2381 |
| 8 | EPON ® 828 | IPA-HDO polyol | 352 | 3.3 | 3336 | 2985 | 2742 | 2803 | 2688 | 2694 |
| 9 | EPON ® 828 | IPA-HDO polyol | 500 | 3.3 | 186 | 1944 | 1926 | 1777 | 1852 | 1789 |
| 10 | EPON ® 828 | PC-1028P-210 | 603 | 3.3 | 1451 | 1369 | 1686 | 1461 | 1378 | 1613 |
| 11 | EPON ® 828 | IPA-HDO polyol | 624 | 3.3 | 3527 | 2897 | 2595 | 2351 | 2345 | 2381 |
| 12 | EPALLOY ® 8240 | PC-1028P-210 | 338 | 3.3 | 2796 | 2431 | 2298 | 2406 | 2277 | 2382 |

[1]STEPANPOL ® PC-1028P-210 is a product of Stepan Company.
[2]IPA-HDO polyol = isophthalic acid/1,6-hexanediol developmental polyol.
[3]EPON ® 828 is a product of Hexion Specialty Chemicals.
[4]EPALLOY ® 8240 is a product of CVC Thermoset Specialties.
CRS = cold-rolled steel.
*metal coupon distorts.

TABLE 4

80° C. Lap Shear Results: Samples Cured at 160° C., 30 min., Aromatic Polyester Polyols

| Ex. | Epoxy[3] | Polyester polyol[1,2] | Index | BF$_3$-MEA, wt. % | Lap shear strength, psi (avg) |
|---|---|---|---|---|---|
| C1 | EPON ® 828 | N/A | N/A | 3.3 | >1700* |
| C2 | EPON ® 828 | N/A | N/A | 1.5 | 105 |
| 4 | EPON ® 828 | PC-1028P-210 | 339 | 3.3 | 946 |
| 5 | EPON ® 828 | PC-1028P-210 | 500 | 3.3 | 62 |
| 6 | EPON ® 828 | PC-1028P-210 | 317 | 1.5 | 892 |
| 7 | EPON ® 828 | PC-1028P-210 | 542 | 1.5 | 221 |
| 8 | EPON ® 828 | IPA-HDO polyol | 352 | 3.3 | 317 |
| 9 | EPON ® 828 | IPA-HDO polyol | 500 | 3.3 | 620 |
| 10 | EPON ® 828 | PC-1028P-210 | 603 | 3.3 | 1234 |
| 11 | EPON ® 828 | IPA-HDO polyol | 624 | 3.3 | 1001 |

[1]STEPANPOL ® PC-1028P-210 is a product of Stepan Company.
[2]IPA-HDO polyol = isophthalic acid/1,6-hexanediol developmental polyol.
[3]EPON ® 828 is a product of Hexion Specialty Chemicals.
*metal coupon distorts and test is discontinued (no adhesive failure).

TABLE 5

Cast Adhesive Properties: Aromatic Polyester Polyols

| Ex. | Epoxy[3,4] | Polyester polyol[1,2] | Index | BF$_3$-MEA, wt. % | Cure conditions | Initial Tg, °C. | Shore A hardness | Peak stress, psi | Modulus, kpsi | Elong., % | TEA, lb./in. |
|---|---|---|---|---|---|---|---|---|---|---|---|
| C1 | EPON ® 828 | N/A | N/A | 3.3 | 180° C./40' | 149 | — | — | — | — | — |
| C2 | EPON ® 828 | N/A | N/A | 1.5 | 180° C./40' | 54 | 95 | 1714 | 202 | 1.1 | 1.1 |
| C3 | EPALLOY ® 8240 | N/A | N/A | 3.3 | 180° C./40' | 87 | — | — | — | — | — |
| 4 | EPON ® 828 | PC-1028P-210 | 339 | 3.3 | 160° C./40' | 33 | 93 | 8346 | 206 | 6.7 | 34 |
| 4A | EPON ® 828 | PC-1028P-210 | 339 | 3.3 | 140° C./2 h | 50 | 96 | 9417 | 208 | 7.5 | 44 |
| 4B | EPON ® 828 | PC-1028P-210 | 339 | 3.3 | 160° C./1 h | 67 | 95 | 9564 | 211 | 7.0 | 40 |
| 4C | EPON ® 828 | PC-1028P-210 | 339 | 3.3 | 180° C./1 h | 77 | 95 | 8777 | 193 | 7.4 | 39 |
| 4D | EPON ® 828 | PC-1028P-210 | 339 | 3.3 | 200° C./1 h | 77 | 95 | 8976 | 195 | 7.4 | 41 |
| 5 | EPON ® 828 | PC-1028P-210 | 500 | 3.3 | 160° C./30' | 38 | 97 | 4013 | 192 | 3.4 | 9.7 |
| 6 | EPON ® 828 | PC-1028P-210 | 317 | 3.3 | 160° C./55' | 30 | 95 | 3330 | 112 | 54 | 150 |
| 7 | EPON ® 828 | PC-1028P-210 | 542 | 1.5 | 160° C./40' | 31 | | 1636 | 44 | 14 | 30 |
| 8 | EPON ® 828 | IPA-HDO polyol | 352 | 3.3 | 160° C./45' | 21 | 91 | 3107 | 106 | 49 | 122 |
| 9 | EPON ® 828 | IPA-HDO polyol | 500 | 3.3 | 160° C./40' | 29 | 98 | 4592 | 130 | 6.7 | 23 |
| 10 | EPON ® 828 | PC-1028P-210 | 603 | 3.3 | 160° C./40' | 36 | 86 | 4744 | 226 | 3.1 | 7.4 |
| 11 | EPON ® 828 | IPA-HDO polyol | 624 | 3.3 | 160° C./45' | 36 | 91 | 7197 | 206 | 5.8 | 28 |
| 12A | EPALLOY ® 8240 | PC-1028P-210 | 338 | 3.3 | 140° C./2 h | 43 | 96 | 9625 | 206 | 7.8 | 50 |
| 12B | EPALLOY ® 8240 | PC-1028P-210 | 338 | 3.3 | 160° C./1 h | 63 | 95 | 8398 | 192 | 7.5 | 35 |
| 12C | EPALLOY ® 8240 | PC-1028P-210 | 338 | 3.3 | 180° C./1 h | 72 | 95 | 9519 | 203 | 7.6 | 43 |
| 12D | EPALLOY ® 8240 | PC-1028P-210 | 338 | 3.3 | 200° C./1 h | 72 | 97 | 9977 | 207 | 7.4 | 46 |

[1]STEPANPOL ® PC-1028P-210 is a product of Stepan Company.
[2]IPA-HDO polyol = isophthalic acid/1,6-hexanediol developmental polyol.
[3]EPON ® 828 is a product of Hexion Specialty Chemicals.
[4]EPALLOY ® 8240 is a product of CVC Thermoset Specialties.
TEA = total energy absorbed.

TABLE 6

Room-Temperature CRS Lap Shear Results: Aliphatic Polyester Polyols

| | | | | | | Lap shear strength, psi (avg) | | | | | |
|---|---|---|---|---|---|---|---|---|---|---|---|
| Ex. | Epoxy[2] | Polyester polyol[1] | Index | BF$_3$-MEA, wt. % | Cure Temp, °C. | 10 min. | 20 min. | 30 min. | 40 min. | 50 min. | 60 min. |
| C1 | EPON ® 828 | N/A | N/A | 3.3 | 160 | 8.8 | 1372 | 1116 | 1072 | 923 | 893 |
| C2 | EPON ® 828 | N/A | N/A | 1.5 | 160 | 12 | 1040 | 1547 | 1617 | 1476 | 1380 |
| 13A | EPON ® 828 | PS-201-165 | 300 | 3.3 | 160 | 0 | 40 | 1010 | 1952 | 2639 | 3182 |
| 13B | EPON ® 828 | PS-201-165 | 300 | 3.3 | 180 | 0 | 1542 | 3036 | 2966 | 3348 | 3194 |
| 13C | EPON ® 828 | PS-201-165 | 300 | 3.3 | 200 | 9.2 | 3279 | 3347 | 3439 | 3283 | 3307 |
| 14A | EPON ® 828 | PC-1011P-210 | 300 | 3.3 | 160 | 0 | 33 | 387 | 1472 | 3153 | 3326 |
| 14 B | EPON ® 828 | PC-1011P-210 | 300 | 3.3 | 180 | 0 | 770 | 2997 | 3512 | 3720 | 3661 |
| 14C | EPON ® 828 | PC-1011P-210 | 300 | 3.3 | 200 | 0 | 3285 | 3827 | 3646 | 3651 | 3816 |

[1]STEPANPOL ® PS-201-165 and STEPANPOL ® PC-1011P-210 are aliphatic polyester polyols, products of Stepan Company.
[2]EPON ® 828 is a product of Hexion Specialty Chemicals.
CRS = cold-rolled steel.

TABLE 7

Cast Adhesive Properties: Aliphatic Polyester Polyols

| Ex. | Epoxy[2] | Polyester polyol[1] | Index | BF$_3$-MEA, wt. % | Cure conditions | Initial Tg, °C. | Shore A hardness | Peak stress, psi | Modulus, kpsi | Elong., % | TEA, lb./in. |
|---|---|---|---|---|---|---|---|---|---|---|---|
| C1 | EPON ® 828 | N/A | N/A | 3.3 | 180° C./40' | 149 | — | — | — | — | — |
| C2 | EPON ® 828 | N/A | N/A | 1.5 | 180° C./40' | 54 | 95 | 1714 | 202 | 1.1 | 1.1 |
| 14A | EPON ® 828 | PC-1011P-210 | 300 | 3.3 | 160° C./40' | 6.1 | 86 | 1240 | 14.5 | 168 | 186 |
| 14B | EPON ® 828 | PC-1011P-210 | 300 | 3.3 | 180° C./30' | 19 | 97 | 2360 | 68.6 | 18 | 39 |
| 15 | EPON ® 828 | PC-1011P-210 | 400 | 3.3 | 160° C./40' | 26 | 94 | 3704 | 107 | 10 | 32 |

TABLE 7-continued

Cast Adhesive Properties: Aliphatic Polyester Polyols

| Ex. | Epoxy[2] | Polyester polyol[1] | Index | BF$_3$-MEA, wt. % | Cure conditions | Initial Tg, °C. | Shore A hardness | Peak stress, psi | Modulus, kpsi | Elong., % | TEA, lb./in. |
|---|---|---|---|---|---|---|---|---|---|---|---|
| 16 | EPON ® 828 | AA-BDO polyol | 300 | 3.3 | 160° C./43' | 13 | — | 1678 | 8.8 | 192 | 218 |
| 17 | EPON ® 828 | PC-201-165 | 300 | 3.3 | 160° C./48' | 1.3 | 87 | 651 | 2.4 | 141 | 78 |

[1]STEPANPOL ® PC-1011P-210 and STEPANPOL ® PC-201-165, aliphatic polyester polyols, are products of Stepan Company. AA-BDO polyol is an adipic acid/1,4-butanediol developmental polyol.
[2]EPON ® 828 is a product of Hexion Specialty Chemicals.
TEA = total energy absorbed.

TABLE 8

Room-Temperature CRS Lap Shear Results: Polyether Polyols

| | | | | | | Lap shear strength, psi (avg) | | | | | |
|---|---|---|---|---|---|---|---|---|---|---|---|
| Ex. | Epoxy[2] | Polyether polyol[1] | Index | BF$_3$-MEA, wt. % | Cure Temp, °C. | 10 min. | 20 min. | 30 min. | 40 min. | 50 min. | 60 min. |
| C1 | EPON ® 828 | N/A | N/A | 3.3 | 160 | | 8.8 | 1372 | 1116 | 1072 | 923 | 893 |
| C2 | EPON ® 828 | N/A | N/A | 1.5 | 160 | 12 | 1040 | 1547 | 1617 | 1476 | 1380 |
| 18A | EPON ® 828 | VORANOL ® 370 | 400 | 3.3 | 160 | 0 | 913 | 2297 | 1560 | 2043 | 2009 |
| 18B | EPON ® 828 | VORANOL ® 370 | 400 | 3.3 | 180 | 271 | 2623 | 2054 | 2082 | 1633 | 1704 |
| 18C | EPON ® 828 | VORANOL ® 370 | 400 | 3.3 | 200 | 565 | 1756 | 1532 | 1557 | 1566 | 1539 |
| 19A | EPON ® 828 | MULTRANOL ® 4030 | 400 | 3.3 | 160 | 0 | 403 | 1927 | 2455 | 2577 | 2455 |
| 19B | EPON ® 828 | MULTRANOL ® 4030 | 400 | 3.3 | 180 | 33 | 2294 | 1974 | 1837 | 1825 | 1697 |
| 19C | EPON ® 828 | MULTRANOL ® 4030 | 400 | 3.3 | 200 | 477 | 1850 | 1847 | 1732 | 1550 | 1629 |
| 21A | EPON ® 828 | MULTRANOL ® 4034 | 300 | 3.3 | 160 | 0 | 507 | 1958 | 1726 | 2268 | 1788 |
| 21B | EPON ® 828 | MULTRANOL ® 4034 | 300 | 3.3 | 180 | 42 | 2026 | 1815 | 1834 | 1696 | 1679 |
| 21C | EPON ® 828 | MULTRANOL ® 4034 | 300 | 3.3 | 200 | 2023 | 1821 | 1768 | 1794 | 1462 | 1500 |
| C22A | EPON ® 828 | CARPOL ® PGP-1000 | 300 | 3.3 | 160 | 0 | 19.3 | 117 | 134 | 206 | 279 |
| C22B | EPON ® 828 | CARPOL ® PGP-1000 | 300 | 3.3 | 180 | 0 | 83.1 | 223 | 285 | 327 | 312 |
| C22C | EPON ® 828 | CARPOL ® PGP-1000 | 300 | 3.3 | 200 | 59 | 175 | 197 | 321 | 356 | 263 |

[1]VORANOL ® 370, glycerin/sucrose-initiated polyether polyol, F = 7.0, product of Dow; MULTRANOL ® 4030 and MULTRANOL ® 4034, sucrose-initiated polyether polyols, products of Covestro; CARPOL ® PGP-1000, polypropylene glycol, mol. wt. 1000, product of Carpenter.
[2]EPON ® 828 is a product of Hexion Specialty Chemicals.
CRS = cold-rolled steel.

TABLE 9

Cast Adhesive Properties: Polyether Polyols

| Ex. | Epoxy[2] | Polyether polyol[1] | Index | BF$_3$-MEA, wt. % | Cure conditions | Initial Tg, °C. | Shore A hardness | Peak stress, psi | Modulus, kpsi | Elong., % | TEA, lb./in. |
|---|---|---|---|---|---|---|---|---|---|---|---|
| C1 | EPON ® 828 | N/A | N/A | 3.3 | 180° C./40' | 149 | — | — | — | — | — |
| C2 | EPON ® 828 | N/A | N/A | 1.5 | 180° C./40' | 54 | 95 | 1714 | 202 | 1.1 | 1.1 |
| 18 | EPON ® 828 | VORANOL ® 370 | 400 | 3.3 | 160° C./45' | 36 | 97 | 2930 | 165 | 3.7 | 7.9 |
| 19 | EPON ® 828 | MULTRANOL ® 4030 | 400 | 3.3 | 160° C./40' | 31 | 95 | 919 | 136 | 1.8 | 1.2 |
| 20 | EPON ® 828 | MULTRANOL ® 4034 | 400 | 3.3 | 160° C./25' | 32 | 95 | 1052 | 161 | 2.3 | 2.6 |
| 21 | EPON ® 828 | MULTRANOL ® 4034 | 300 | 3.3 | 160° C./40' | 37 | 95 | 1619 | 157 | 2.9 | 3.1 |
| C22A | EPON ® 828 | CARPOL ® PGP-1000 | 300 | 3.3 | 160° C./40' | — | 45 | 36 | 0.09 | 40 | 1.0 |
| C22B | EPON ® 828 | CARPOL ® PGP-1000 | 300 | 3.3 | 180° C./30' | — | 39 | 51 | 0.14 | 36 | 1.4 |

[1]VORANOL ® 370, glycerin/sucrose-initiated polyether polyol, F = 7.0, product of Dow; MULTRANOL ® 4030 and MULTRANOL ® 4034, sucrose-initiated polyether polyols, products of Covestro; CARPOL ® PGP-1000, polypropylene glycol, mol. wt. 1000, product of Carpenter.
[2]EPON ® 828 is a product of Hexion Specialty Chemicals.
TEA = total energy absorbed.

The preceding examples are meant only as illustrations; the following claims define the inventive subject matter.

We claim:
1. A process for making a one-component (1K) adhesive, the process comprising reacting a mixture which comprises:
 (a) a polyepoxide compound having an equivalent weight within the range of 125 to 250 g/eq.;
 (b) a composition comprising:
  (i) a polyester polyol having a hydroxyl value within the range of 100 to 250 mg KOH/g, an average hydroxyl functionality within the range of 1.5 to 4.0, and an acid number less than 5 mg KOH/g; and
  (ii) a polyether polyol having a hydroxyl value within the range of 28 to 800 mg KOH/g and an average hydroxyl functionality within the range of 2.7 to 8.0;
 and
 (c) a heat-activated Lewis acid catalyst;
 at a temperature within the range of 100° C. to 220° C. for a time effective to cure the adhesive, wherein the ratio of epoxy equivalents of the polyepoxide compound to hydroxyl equivalents of the polyol composition is within the range of 2.5:1 to 3.5:1.

2. The process of claim 1 wherein the adhesive has a glass-transition temperature as measured by differential scanning calorimetry within the range of –20° C. to 80° C.

3. A process for making a one-component (1K) adhesive, the process comprising reacting a mixture which comprises:
   (a) an aromatic polyepoxide compound having an equivalent weight within the range of 125 to 250 g/eq.;
   (b) a composition comprising:
   (i) a polyester polyol having a hydroxyl value within the range of 50 to 400 mg KOH/g, an average hydroxyl functionality within the range of 1.5 to 4.0, and an acid number less than 5 mg KOH/g; and
   (ii) a polyether polyol having a hydroxyl value within the range of 28 to 800 mg KOH/g and an average hydroxyl functionality within the range of 2.7 to 8.0;
   and
   (c) a heat-activated Lewis acid catalyst;
   at a temperature within the range of 100° C. to 220° C. for a time effective to cure the adhesive.

4. The process of claim 1 wherein the polyepoxide compound is an aliphatic or cycloaliphatic polyepoxide.

5. The process of claim 1 wherein the polyol composition comprises an aromatic polyester polyol, an aliphatic polyester polyol, or a mixture thereof.

6. The process of claim 1 wherein the average hydroxyl functionality of the polyester polyol is within the range of 1.8 to 3.5.

7. The process of claim 1 wherein the average hydroxyl functionality of the polyether polyol is within the range of 3.0 to 8.0.

8. The process of claim 1 wherein the adhesive has a glass-transition temperature within the range of 0° C. to 80° C.

9. The process of claim 1 wherein the reaction is performed at a temperature within the range of 130° C. to 210° C.

10. The process of claim 1 wherein the catalyst is a complex of boron trifluoride and a primary aliphatic amine.

11. The process of claim 10 wherein the primary aliphatic amine is ethylamine.

12. The process of claim 1 wherein the reaction mixture is heated for 10 to 60 minutes.

13. A one-component structural adhesive made by the process of claim 1.

14. A heat-curable, one-component adhesive mixture, comprising:
   (a) a polyepoxide compound having an equivalent weight within the range of 125 to 250 g/eq.;
   (b) a composition comprising:
   (i) a polyester polyol having a hydroxyl value within the range of 100 to 250 mg KOH/g, an average hydroxyl functionality within the range of 1.5 to 4.0, and an acid number less than 5 mg KOH/g; and
   (ii) a polyether polyol having a hydroxyl value within the range of 28 to 800 mg KOH/g and an average hydroxyl functionality within the range of 2.7 to 8.0;
   (c) a heat-activated Lewis acid catalyst;
   wherein the mixture is curable at temperatures within the range of 100° C. to 220° C., wherein the ratio of epoxy equivalents of the polyepoxide compound to hydroxyl equivalents of the polyol composition is within the range of 2.5:1 to 3.5:1.

15. The mixture of claim 14 wherein the heat-activated Lewis acid catalyst is a complex of boron trifluoride and a primary aliphatic amine.

16. The mixture of claim 15 wherein the primary aliphatic amine is ethylamine.

17. The mixture of claim 14 wherein the mixture is curable at temperatures within the range of 130° C. to 210° C.

* * * * *